Patented Jan. 11, 1949

2,458,843

UNITED STATES PATENT OFFICE 2,458,843

METHOD OF IMPROVING CURED BUTYL RUBBER FOR PRESSURE WORKING

Wilbur F. Fischer, Roselle Park, N. J., assignor to Standard Oil Development Company, a corporation of Delaware No Drawing. Application January 1, 1943, Serial No. 471,010

2 Claims. (Cl. 260—93)

This application relates to synthetic polymers; relates especially to a low temperature interpolymer of an iso-olefin with a diolefin, and relates particularly to improved methods for extruding and processing a synthetic polymer and to the product obtained thereby.

It has been found possible to interpolymerize an iso-olefin, such as isobutylene, with a diolefin, such as butadiene, by cooling the mixture to a low temperature and polymerizing it by the application thereto of a Friedel-Crafts catalyst dissolved in a low-freezing, non-complex-forming solvent. The resulting polymer is reactive with sulfur and is a high grade substitute for natural rubber for many uses, including hose, tires, inner tubes, sheeting, proofed goods, insulation and the like.

However, difficulty has been encountered in the processing operations required for forming the polymer into desired shapes, particularly in such operations as calendering, extruding, and the like, because of the "nerviness" of the polymer which makes the raw gum polymer resistant to such forming operations and causes calendered and extruded products especially to be very rough and irregular.

The present invention modifies the processing of the polymer and overcomes these objections, making it capable of smooth, easy, satisfactory handling in shaping operations generally and especially in operations of the type of calendering, extruding and similar pressure forming. By this new process, material becomes readily calenderable, extrudes easily and satisfactorily to yield smooth unbroken calendered sheet or extruded strip with very little stock recovery, little shrinkage, substantial absence of porosity, a reduction in tackiness, and additional raw gum stock strength and a reduction of both cold and hot flow of the uncured material. Also it yields a low gravity compound. In essence, the process of the invention consists in compounding a portion of the polymer with a curing agent, such as sulfur, preferably with a sulfurization aid such as tetramethyl thiuram disulfide and the like, or para quinone dioxime or its homologues and analogues; then milling the cured polymer to plasticity, adding to it an additional, preferably larger, portion of uncured polymer, milling the two together to admixture, adding the desirable curing agents such as sulfur or the para quinone dioxime substance and also appropriate pigments, extenders and the like. This mixture is readily susceptible to extrusion, calendering and the like; and yields a highly satisfactory extruded product, whether inner tubes, treads, insulated wires, tubing or the like.

Thus, an object of the invention is to pressure work, or extrude a low temperature interpolymer of an iso-olefin with a diolefin as a smooth, uniform, readily produced shape by precuring a portion of the polymer, replasticizing it after curing, inter-mixing it with a further portion of uncured polymer and extruding the mixture. Other objects and details of the invention will be apparent from the following description.

The raw material of the present invention is prepared by mixing together a major proportion of an iso-olefin having from 4 to 7, inclusive, carbon atoms per molecule, preferably isobutylene, with a minor proportion of a polyolefin having 4 to about 12 carbon atoms per molecule, such as butadiene, isoprene, piperylene, dimethyl butadiene, which are representative of the conjugated diolefins; or dimethallyl which is representative of the non-conjugated diolefins, or the triolefin, myrcene, which is representative of the higher polyolefins. The preferred proportions lie within the range of 70 to 99.5 parts of the iso-olefin with 30 to 0.5 parts of the diolefin. This mixture is cooled to a temperature preferably within the range of about —40° C. to about —160° C. The cooling may be accomplished by the use of a refrigerating jacket applied to the polymerization reactor or to the mixer in which the olefinic material is prepared; or the temperature may be obtained by the direct admixture of a suitable refrigerant with the olefinic material. In the latter case, the preferred refrigerant is liquid ethylene or solid carbon dioxide. In the event a refrigerating jacket is used, practically any of the well-known low-boiling liquids may be used for refrigerants, including sulfur dioxide, preferably under a vacuum, ammonia, likewise preferably under a vacuum, liquid carbon dioxide, liquid ethylene, liquid methane, liquid ethane and the like under vacuum or pressure as desired to control the refrigeration temperature.

To this rapidly stirred cold mixture, there is then added a polymerization catalyst consisting of a Friedel-Crafts halide in a low-freezing, non-complex-forming solvent. The Friedel-Crafts halide may consist of any of the Friedel-Crafts catalysts shown by N. O. Calloway in his article on "The Friedel-Crafts synthesis," printed in the issue of Chemical Reviews, published for the American Chemical Society at Baltimore in 1935 in volume XVII, No. 3, the article beginning on page 327, the list being particularly well shown on page 375. The preferred catalyst solvents are the lower alkyl halides, such as ethyl or methyl chloride or carbon disulfide. However, practically any of the alkyl halides having freezing points below about —20° C., as shown by Wiezevich and Vesterdal in their article on "Halogenated hydrocarbon solvent" printed in the issue of Chemical Reviews published for the American Chemical Society in October, 1936, being volume XIX, No. 2, the article beginning on page 101, the list of solvents being particularly well shown on pages 108 and 109. The only requirements are that the solvent shall be liquid at a temperature near to the polymerization temperature, although not necessarily as low as the polymerization temperature, and that the solvents shall form no complex with the Friedel-Crafts halide, but shall be capable of being substantially wholly volatilized away from the Friedel-Crafts halide at its normal boiling point.

The catalyst solution is intermixed quickly into the olefinic mixture, preferably in the form of a spray applied to the surface of the rapidly stirred mixture, or admixed in liquid form directly into a zone of high turbulence to obtain the maximum speed of intermixture. The reaction proceeds rapidly to yield a solid polymer which is removed from the cold reaction mixture, brought up to room temperature and washed, preferably in warm water, to remove as much as possible of the volatile components and to remove the catalyst.

The resulting polymer is a white solid having a molecular weight according to the Staudinger method (as presented in Die Hochmolekularen Organischen Verbindungen, under the authorship of H. Staudinger, printed in Berlin in 1932, the procedure being particularly well shown on page 56) of from 20,000 to 150,000. The polymer likewise has an iodine number as determined by the "Wijs" method of from 1 to 40 or 50. The polymer likewise is reactive with sulfur and various other compounds, such as the quinone dioximes in a curing reaction.

For the curing procedure, the polymer is preferably compounded with small quantities of zinc oxide and stearic acid, and small or substantial quantities of a pigment, such as carbon black, and also with a curing agent which may be approximately 3% of sulfur together with a sulfurization aid, such as tetramethyl thiuram disulfide, or may be approximately 1 part per 100 of polymer of para quinone dioxime or the like. The compound is then cured, preferably under pressure, by the application of heat at temperatures ranging from 100° C. to 200° C. for time intervals ranging from 2 hours to 1 minute, depending upon the choice of sulfurization aid, the quantity, and the curing temperature.

In practicing the present invention, the polymer is prepared as above described, and after washing and drying is compounded according to the following formula:

|  | Parts |
|---|---|
| Interpolymer | 100 |
| Carbon black | 0 to 200 |
| Zinc oxide | 0 to 10 |
| Stearic acid | 0 to 10 |
| Sulfur | 1 to 5 |
| Tuads (tetramethyl thiuram disulfide) | .5 to 3 |

This mixture is conveniently prepared upon the open roll mill, with the compounding ingredients, fillers and the like milled in until a homogeneous mixture is obtained. A portion of this mixture is then put under pressure and subjected to a heat treatment. This heat treatment, as above indicated, cures the polymer.

The cured polymer is then put back onto the mill, preferably an open roll mill, although a Banbury mill may be used or even a Werner and Pfleiderer kneader, and milled until it is replasticized. A further portion of the raw polymer within the range of from 10 to 10 parts per part of cured polymer, preferably also compounded according to the above recipe, is then added to the replasticized polymer and the milling continued until a thoroughly homogeneous mixture is obtained.

This material is then transferred to an extruder equipped with an extrusion orifice of the desired shape, and the mixture is extruded to yield a smooth, highly satisfactory, extrusion product, or calendered, or otherwise pressure formed, and is then cured in any desired way.

The resulting cured polymer material, after extrusion and curing, shows a tensile strength within the range of about 2500 to 4500 lbs. per sq. in., and an elongation at break ranging between 500 and 1200%. The material is fully saturated chemically and shows a high resistance to abrasion, a high resistance to repeated flexure, an extremely high resistance to water and aqueous solutions generally, including both acid and alkali, and an extremely high resistance to oxygenated organic solvents. It swells in the hydrocarbons and the chlorinated hydrocarbons, but after curing is insoluble therein.

By this procedure it is possible to apply to the polymer any desired type of "pressure working" procedure by which is meant such items as calendering, extrusion and analogous shaping processes while maintaining the desirable physical properties of the polymer, to avoid the roughness, swell, porosity and similar defects which tend to occur with the polymer in the ordinary working operations.

*Example 1*

A sample of interpolymer was prepared as above outlined, utilizing for the polymerization mixture 98.55 parts of isobutylene with 1.45 parts of isoprene to yield a material having a molecular weight of approximately 80,000.

A portion of this material was compounded according to the following recipe:

|  | Parts |
|---|---|
| Polymer | 100 |
| Zinc oxide | 5 |
| Stearic acid | 3 |
| Sulfur | 1.5 |
| Tuads (tetramethyl thiuram disulfide) | 1 |

This compound was then cured under pressure to yield a supply of cured polymer. A series of mixtures was then prepared according to the following recipes by milling the cured polymer to plasticity in an amount as indicated in the recipe and then adding to it the additional amounts of uncured polymer as shown in the recipes. The resulting compounds were then cured for 90 minutes at 307° F. to yield the results shown in the accompanying inspection record.

| Stock No. | 1 | 2 | 3 | 4 | 5 |
|---|---|---|---|---|---|
| COMPOUNDING RECIPES | | | | | |
| Polymer | 100 | 100 | 100 | 100 | 100. |
| Cured Polymer |  | 30 | 120 |  | 30. |
| ZnO | 5 | 5 | 5 | 5 | 5. |
| Stearic Acid | 3 | 3 | 3 | 3 | 3. |
| Sulfur | 1.5 | 1.89 | 3 | 1.5 | 1.87. |
| Tuads | 1.0 | 1.25 | 2 | 1.0 | 1.25. |
| Gastex (Semi-reinforcing Black) |  |  |  | 30 | 30. |
| PHYSICAL DATA | | | | | |
| Tensile 90'/307° F | 2,610 | 2,586 | 2,670 | 2,450 | 2,525. |
| Modulus, 500% | 64 | 83 | 118 | 460 | 319. |
| Elongation | 1,030 | 1,000 | 1,000 | 890 | 940. |
| Shore Hardness | 27 | 25 | 29 | 36 | 34. |
| Plasticity 70° C. 5 Kg. Wt. | 107-6 | 124-11 | 144-15 | 114-8 | 127-7. |

GOODRICH FLEXOMETER

| | | | | | |
|---|---|---|---|---|---|
| Condition, 2.50" stroke 89 lbs./sq. in.; 100° C.: | | | | | |
| Init. Static Compression | .482 | | .500 | .380 | .420 |
| Init. Dynamic Compression | .333 | 0 | .366 | .251 | .379 |
| Dynamic Deflection | .038 | | .022 | .209 | .126 |
| Temperature Rise, °C | 17 | | 14 | 31 | 34 |
| Time of Run, Minutes | 5 | | 5 | 30 | 30 |
| Final Condition | Shattered | | Shattered | Bad | Poor |

HOT FLOW (EXTENSION METHOD)

| | | | | | |
|---|---|---|---|---|---|
| (Hourly figures on percent elongation): | | | | | |
| 1st hr | 82 | 76 | 90 | 92 | 81 |
| 3rd hr | 134 | 109 | 150 | 125 | 112 |
| 5th hr | 156 | 143 | 187 | 150 | 140 |
| 7th hr | 203 | 162 | 225 | 168 | 175 |
| Lbs./in.² | 28 | 16 | 32 | 55 | 41 |

EXTRUSION DATA

| | | | | |
|---|---|---|---|---|
| Rate (inches/min.) | 21 | 34 | 44 | |
| Percent Swell (diameter) | 66 | 42 | 32 | |
| Appearance | Very rough—porous | Rough—non-porous | Smooth—non-porous | |

CALENDERING DATA

| | | | | |
|---|---|---|---|---|
| Rate (in./min.) | 92 | | 114 | |
| Appearance | Lacy—full of holes | | Very smooth | |
| Stock thickness @ .010" setting | .015" | | .011" | |
| Stock Width @ 7" setting | 7½" | | 6¾" | |

PERMEABILITY TO GASES

| | | | |
|---|---|---|---|
| | ¾ liters/sq. meter/ 24 hrs. | | 2.48 liters/sq. meter/ 24 hrs. |

Example 2

It is not necessary that fresh polymer be used for the curing and remilling steps. Instead, polymer reclaim is perfectly satisfactory. For this purpose the reclaim in practically any form in which it is received such as old inner tubes, worn out tire carcasses, and the like is disintegrated or shredded into small fragments and given an alkali treatment to remove as much as possible of the fabric base of the carcass. The alkali treated residue is then washed thoroughly and put upon a mill, being milled to plasticity, as previously described. This material being already fully compounded with pigment and processing aids, needs no further treatment, but as soon as it is fully replasticized, is ready to be intermixed with a further portion of uncured polymer compounded according to a recipe such as that set out in Example 1. By this means it is readily possible to reclaim almost unlimited quantities of polymer from used articles.

Example 3

Another specimen of isobutylene isoprene polymer prepared as above described was compounded according to the following series of recipes:

| | Parts | Parts | Parts | Parts |
|---|---|---|---|---|
| Isobutylene-isoprene polymer | 100.0 | 100.0 | 100.0 | 100.0 |
| Precured isobutylene-isoprene polymer | | 27.5 | 55 | 110.5 |
| Zinc Oxide | 5 | 5 | 5 | 5 |
| Stearic Acid | 3 | 3 | 3 | 3 |
| Sulfur | 1.5 | 1.9 | 2.3 | 3 |
| Tuads | 1 | 1.25 | 1.5 | 2 |
| Cabot #9 carbon black | 50 | 62.5 | 75 | 100 |

Samples of the above compounds were then prepared, some by curing in molds and others by extrusion and curing, and the following inspection record shows the character of the product obtained:

Physical data

| | | | | |
|---|---|---|---|---|
| Cured 60' @ 307° F.: | | | | |
| Tensile and Elongation | 2,177—850 | 2,513—740 | 2,673—757 | 2,580—710 |
| Modulus @ 300% (Shore) | 249—46 | 468—54 | 529—59 | 529—53 |
| High Temperature Tensile @ 212° F. Cured 60' @ 307° F.: | | | | |
| Tensile and Elongation | 986—1,100+ | 1,270—1,020 | 1,460—965 | 1,397—850 |
| Percent Tensile Retained | 45 | 51 | 55 | 54 |
| After 4 days in Geer Oven @ 70° C. Cured 60' @ 307° F.: | | | | |
| Tensile and Elongation | 2,133—730 | 2,547—715 | 2,767—700 | 2,703—680 |
| Percent Tensile Retained | 98 | 101 | 104 | 105 |
| After 7 days in Geer Oven @ 70° C. Cured 60' @ 307° F.: | | | | |
| Tensile and Elongation | 2,370—720 | 2,547—680 | 2,643—640 | 2,547—630 |
| Percent Tensile Retained | 109 | 101 | 99 | 99 |
| Goodrich Flexometer Data (0.125" stroke, 148 lbs./in.², 100° C.): | | | | |
| Static Compression, In | .564 | .476 | .463 | .415 |
| Initial Dynamic Comp., In | .523 | .441 | .411 | .375 |
| Dynamic Draft, In | .080 | .161 | .193 | .205 |
| Temperature Rise, °C | 40 | 37 | 39 | 33 |
| Time of Run, min | 9 | 21 | 25 | 30 |
| Appearance | Very Bad | Very Bad | Bad | Poor |
| 93'/307° F. | | | | |
| Rebound Percent (Room Temperature @ 100° F.) Cured 90' @ 307° F. | 27—48 | 27—46 | 26—44 | 26.8—47 |
| Abrasion (Vol. Loss c. c./H. P./Hr.): Cured 90' @ 307° F | 407 | 408 | 386 | 391 |
| Tear Resistance (Lbs. per Square In.): Cured 90' @ 307° F | 397 | 440 | 435 | 425 |
| Extrusion Data: | | | | |
| Rate, min | 40" | 44" | 40" | 38" |
| Percent Swell (dia.) | 31 | 22 | 21 | 20 |
| | Clear, Smooth, Porous | Very Smooth, Non-Porous | Very Smooth, Non-Porous | Smooth, Non-Porous |

These results show adequate physical properties generally for the material and show a very substantial improvement in response to processing treatments generally, especially those on the order of calendering and extrusion.

Thus, the invention consists in a process for improving the pressure working of a low temperature, iso-olefin-diolefin interpolymer, including the steps of compounding and curing a portion of the polymer, replasticizing it and mixing it with a further portion of uncured polymer, then extruding the mixture and recuring the extruded material.

While there are above disclosed but a limited number of embodiments of the invention, it is possible to provide still other embodiments without departing from the inventive concept herein disclosed, and it is therefore desired that only such limitations be imposed upon the appended claims as are stated therein or required by the prior art.

The invention claimed is:

1. In the treatment of a material prepared by reacting together a major proportion of isobutylene with a minor proportion of a conjugated di-olefin having four to twelve inclusive carbon atoms per molecule, at a temperature between −40° C. and −160° C. in the presence of a polymerization catalyst comprising a Friedel-Crafts halide in solution in an alkyl halide having a freezing point below about −20° C. and non-reactivity with the Friedel-Crafts halide, comprising the steps in combination of chemically combining into the polymer a curing agent, milling the cured polymer to plasticity and intermixing therewith a further portion of uncured polymer, thereafter milling into the mixture a further portion of curing agent and then heating the mixed materials to a curing temperature for a curing time interval.

2. In the treatment of a material prepared by reacting together a major proportion of isobutylene with a minor proportion of isoprene at a temperature between −40° C. and −160° C. in the presence of a polymerization catalyst comprising a Friedel-Crafts halide in solution in an alkyl halide having a freezing point below about −20° C. and non-reactivity with the Friedel-Crafts halide, comprising the steps in combination of chemically combining into the polymer a curing agent, milling the cured polymer to plasticity and intermixing therewith a further portion of uncured polymer, thereafter milling into the mixture a further portion of curing agent and then heating the mixed materials to a curing temperature for a curing time interval.

WILBUR F. FISCHER.

No references cited.